US010221300B2

(12) United States Patent
Hagstrand et al.

(10) Patent No.: US 10,221,300 B2
(45) Date of Patent: *Mar. 5, 2019

(54) CROSSLINKED POLYMER COMPOSITION, POWER CABLE INSULATION AND POWER CABLE

(71) Applicant: BOREALIS AG, Vienna (AT)

(72) Inventors: Per-Ola Hagstrand, Stenungsund (SE); Villgot Englund, Göteborg (SE); Annika Smedberg, Myggenäs (SE); Andreas Farkas, Stenungsund (SE); Carl-Olof Olsson, Västerås (SE)

(73) Assignee: BOREALIS AG, Vienna (AT)

( * ) Notice: Subject to any disclaimer, the term of this patent is extended or adjusted under 35 U.S.C. 154(b) by 0 days.

This patent is subject to a terminal disclaimer.

(21) Appl. No.: 15/105,238

(22) PCT Filed: Aug. 19, 2014

(86) PCT No.: PCT/EP2014/067629
§ 371 (c)(1),
(2) Date: Jun. 16, 2016

(87) PCT Pub. No.: WO2015/090640
PCT Pub. Date: Jun. 25, 2015

(65) Prior Publication Data
US 2016/0319104 A1 Nov. 3, 2016

(30) Foreign Application Priority Data
Dec. 19, 2013 (EP) ...................................... 13198411

(51) Int. Cl.
C08K 5/375 (2006.01)
C08K 5/14 (2006.01)
C08K 5/01 (2006.01)
H01B 3/44 (2006.01)

(52) U.S. Cl.
CPC ................ C08K 5/375 (2013.01); C08K 5/01 (2013.01); C08K 5/14 (2013.01); H01B 3/441 (2013.01)

(58) Field of Classification Search
CPC . C08K 5/375; C08K 5/14; C08K 5/01; H01B 3/441
USPC ......................................................... 524/333
See application file for complete search history.

(56) References Cited

U.S. PATENT DOCUMENTS

| | | |
|---|---|---|
| 3,401,020 A | 9/1968 | Kester et al. |
| 3,922,335 A | 11/1975 | Jordan et al. |
| 4,340,577 A | 7/1982 | Sugawara et al. |
| 4,391,789 A | 7/1983 | Estopinal |
| 2002/0177638 A1* | 11/2002 | Sakurai .................... C08K 5/14 524/91 |
| 2009/0247678 A1* | 10/2009 | Lee .......................... C08L 23/06 524/287 |
| 2012/0305284 A1* | 12/2012 | Nilsson .................... C08F 10/02 174/110 SR |
| 2013/0000947 A1 | 1/2013 | Smedberg et al. |
| 2013/0081854 A1 | 4/2013 | Englund et al. |
| 2013/0284486 A1 | 10/2013 | Nilsson et al. |
| 2013/0313000 A1* | 11/2013 | Nilsson .................. C08K 5/375 174/120 SR |

FOREIGN PATENT DOCUMENTS

| | | |
|---|---|---|
| EP | 629222 | 12/1994 |
| EP | 1695996 | 7/2008 |
| EP | 1695992 | 1/2010 |
| EP | 2499172 | 9/2012 |
| EP | 2439234 | 4/2013 |
| EP | 3083795 | 10/2016 |
| JP | S63190206 | 8/1988 |
| JP | S6454605 | 3/1989 |
| JP | H0198643 | 4/1989 |
| JP | H0269541 | 3/1990 |
| JP | 2002128961 A | 5/2002 |
| JP | 2006182941 A | 7/2006 |
| RU | 2394854 | 7/2010 |
| WO | 9308222 | 4/1993 |
| WO | 9635732 | 11/1996 |
| WO | 2006089744 | 8/2006 |
| WO | 2007123331 A1 | 11/2007 |
| WO | 2011057927 | 5/2011 |
| WO | 2011057928 | 5/2011 |
| WO | 2012150287 | 11/2012 |
| WO | 2013022206 | 2/2013 |

OTHER PUBLICATIONS

European International Search Report for PCT/EP2014/067628, dated Oct. 2, 2014.
European International Search Report for PCT/EP2014/067633, dated Oct. 29, 2014.
European International Search Report for PCT/EP2014/067630, dated Oct. 17, 2014.

(Continued)

*Primary Examiner* — Michael Bernshteyn
(74) *Attorney, Agent, or Firm* — Meunier Carlin & Curfman LLC

(57) ABSTRACT

The present invention relates to a crosslinked polymer composition, which is obtained by crosslinking a polymer composition, which polymer composition has a melt flow rate (MFR) of at least 1.7 and comprises a polyolefin, peroxide and sulphur containing antioxidant, characterized by that the crosslinked polymer composition has an Oxidation Induction Time, determined according to ASTM-D3895, ISO/CD 11357 and EN 728 using a Differential Scanning Calorimeter (DSC), which Oxidation Induction Time corresponds to Z minutes, and comprises an amount of peroxide by-products which corresponds to W ppm determined according to BTM2222 using HPLC, wherein $Z_1 \leq Z \leq Z_2$, $W_1 \leq W \leq W_2$, and $W \leq p-270*Z$, wherein $Z_1$ is 0, $Z_2$ is 60, $W_1$ is 0 and $W_2$ is 9500, and p is 18500; and use thereof, a power cable insulation and a power cable, useful in high voltage (HV) and extra high voltage (EHV) cable applications direct current (DC) applications.

18 Claims, No Drawings

(56) References Cited

OTHER PUBLICATIONS

Third Party Submission filed Dec. 22, 2016 in U.S. Appl. No. 15/105,226.
Third Party Submission filed Dec. 22, 2016 in U.S. Appl. No. 15/105,230.
Third Party Submission filed Jun. 2, 2017 in U.S. Appl. No. 15/105,235.
Non-Final Office Action dated Sep. 13, 2017 in U.S. Appl. No. 15/105,230.
Encyclopedia of Polymer Science and Engineering, vol. 6, 1986, pp. 383-410.
Klimesch, R., et al., "Polyethylene: High-pressure," Encyclopedia of Materials: Science and Technology, Elsevier Science Ltd., 2001, pp. 7181-7184.
Olsson, C.O., et al., "Experimental determination of DC conductivity for XLPE Insulation," Proceedings of the 21st Nordic Insulation Symposium (Nord-IS '09), Gothenburg, Sweden, Jun. 15-17, 2009, pp. 55-58.
Randall, J.C., "A Review of High Resolution Liquid 13Carbon Nuclear Magnetic Resonance Characterizations of Ethylene-Based Polymers," Journal of Macromolecular Science, Part C: Polymer Reviews, vol. 29, Issues 2-3, 1989, pp. 201-317.
European International Search Report for PCT/EP2014/067629, dated Oct. 2, 2014.
Search Report dated Apr. 18, 2018 in related Russian application 2016125882/05(040492).
Final Office Action dated May 4, 2018 in related U.S. Appl. No. 15/105,230.
Restriction Requirement dated Mar. 8, 2018 in related U.S. Appl. No. 15/105,235.
Andersson, J., et al. "Comparison of Test Setups for High Field Conductivity of HVDC Insulation Materials." Nordic Insulation Symposium, Nord-IS 13, Trondheim, Norway, Jun. 9-12, 2013, pp. 161-164.
Non-Final Office Action dated Jul. 20, 2018 in related U.S. Appl. No. 15/105,226.
Non-Final Office Action dated Sep. 5, 2018 in related U.S. Appl. No. 15/105,235.

* cited by examiner

CROSSLINKED POLYMER COMPOSITION, POWER CABLE INSULATION AND POWER CABLE

FIELD OF INVENTION

The invention relates to a crosslinked polymer composition, a power cable insulation, and a power cable, which polymer composition, crosslinked polymer composition, power cable insulation, and power cable, may be especially useful in high voltage (HV) and extra high voltage (EHV) cable applications, for example, high voltage direct current (HV DC) applications and extra high voltage direct current (EHV DC) applications. The invention further relates to the use of the crosslinked polymer composition.

BACKGROUND ART

Polyolefins produced in a high pressure (HP) process are widely used in demanding polymer applications wherein the polymers must meet high mechanical and/or electrical requirements. For instance in power cable applications, particularly in medium voltage (MV) and especially in high voltage (HV) and extra high voltage (EHV) cable applications the electrical properties of the polymer composition has a significant importance. Furthermore, the electrical properties of importance may differ in different cable applications, as is the case between alternating current (AC) and direct current (DC) cable applications.

Crosslinking of Cables

A typical power cable comprises a conductor surrounded, at least, by an inner semiconductive layer, an insulation layer and an outer semiconductive layer, in that order. The cables are commonly produced by extruding the layers on a conductor. The polymer material in one or more of said layers is then normally crosslinked to improve e.g. heat and deformation resistance, creep properties, mechanical strength, chemical resistance and abrasion resistance of the polymer in the layer(s) of the cable. In crosslinking reaction of a polymer interpolymer crosslinks (bridges) are primarily formed. Crosslinking can be achieved using e.g. a free radical generating compound, such as a peroxide. Free radical generating agent is typically incorporated to the layer material prior to, or during, the extrusion of the layer(s) on a conductor. After formation of the layered cable, the cable is then subjected to a crosslinking step to initiate the radical formation and thereby crosslinking reaction.

Peroxides are very common free radical generating compounds used i.a. in the polymer industry for said polymer modifications. The resulting decomposition products of peroxides may include volatile by-products which are undesired, since they may have a negative influence on the electrical properties of the cable. Therefore the volatile decomposition products such as methane e.g. where, for example, dicumylperoxide is used, are conventionally reduced to a minimum or removed after crosslinking and cooling step. Such removal step is generally known as a degassing step. The degassing step is time and energy consuming and is thus a costly operation in a cable manufacturing process.

Also the used cable production line and desired production speed can bring limitations to the cable materials especially when producing power cables of a larger size.

Electrical Conductivity

The DC electrical conductivity is an important material property e.g. for insulating materials for high voltage direct current (HV DC) cables. First of all, the temperature and electric field dependence of this property will influence the electric field. The second issue is the fact that heat will be generated inside the insulation by the electric leakage current flowing between the inner and outer semiconductive layers. This leakage current depends on the electric field and the electrical conductivity of the insulation. High conductivity of the insulating material can even lead to thermal runaway under high stress/high temperature conditions. The conductivity must therefore be sufficiently low to avoid thermal runaway.

Accordingly, in HV DC cables, the insulation is heated by the leakage current. For a specific cable design the heating is proportional to the insulation conductivity×(electrical field)$^2$. Thus, if the voltage is increased, far more heat will be generated.

There are high demands to increase the voltage of a power cable to achieve an increased power transmission, for example, of direct current DC power cable, and, e.g., EP2499172 provides a polymer composition which comprises a polyolefin and which has properties making it suitable for a DC power cable.

However, there is still a continuous need to find alternative polymer compositions with reduced conductivity. Such polymer compositions should suitably also have good mechanical properties required for demanding power cable embodiments.

OBJECTS OF THE INVENTION

One of the objects of the present invention is to provide an alternative crosslinked polymer composition, which is obtained by crosslinking a polymer composition comprising a polyolefin, peroxide and sulphur containing antioxidant, has surprisingly advantageous properties suitable for a power cable, e.g. a DC power cable.

A further object of the invention is to provide a power cable insulation which comprises the crosslinked polymer composition of the present invention.

Another object of the invention is to provide a power cable, e.g. a direct current (DC) power cable, which comprises the crosslinked polymer composition, or the power cable insulation, both of the present invention.

Still a further object of the invention is use of the crosslinked polymer composition of the present invention, for producing at least one layer, e.g., at least an insulation layer, of a crosslinked power cable, e.g., of a crosslinked direct current (DC) power cable.

The invention and further objects thereof are described and defined in details herein.

DESCRIPTION OF THE INVENTION

The present invention provides a crosslinked polymer composition, which is obtained by crosslinking a polymer composition, which polymer composition has a melt flow rate (MFR) of at least 1.7 and comprises a polyolefin, peroxide and sulphur containing antioxidant, characterised by that the crosslinked polymer composition has an Oxidation Induction Time, determined according to ASTM-D3895, ISO/CD 11357 and EN 728 using a Differential Scanning Calorimeter (DSC), which Oxidation Induction Time corresponds to Z minutes, and comprises an amount of peroxide by-products which corresponds to W ppm determined according to BTM2222 using HPLC wherein $Z_1 \leq Z \leq Z_2$, $W_1 \leq W \leq W_2$, and
$W \leq p - 270*Z$, wherein
$Z_1$ is 0, $Z_2$ is 60, $W_1$ is 0 and $W_2$ is 9500, and p is 18500.

The crosslinked polymer composition comprises polyolefin and peroxide by-products in amounts, and has an Oxidation Induction Time, as defined above, below or in claims. The crosslinked polymer composition is crosslinked via radical reaction using peroxide in the presence of a sulphur containing antioxidant. The crosslinked polymer composition has a typical network, i.a. interpolymer crosslinks (bridges), as well known in the field.

The Oxidation Induction Time method, determined according to ASTM-D3895, ISO/CD 11357 and EN 728 using a Differential Scanning Calorimeter (DSC), is described under "Determination Methods".

The amount of peroxide by-products which corresponds to W ppm determined according to BTM2222 using HPLC.

Note that by melt flow rate (MFR) herein it is meant $MFR_2$ (2.16 kg, 190° C.).

The crosslinked polymer composition of the present invention may be obtained by crosslinking a polymer composition, which polymer composition has a melt flow rate (MFR) of at least 1.7 and comprises a polyolefin, peroxide and sulphur containing antioxidant, wherein the amount peroxide corresponds to X mmol —O—O—/kg polymer composition, and the amount sulphur containing antioxidant corresponds to Y mmol —OH/kg polymer composition, wherein the "—OH" in "Y mmol —OH/kg polymer composition" is understood to be phenolic —OH, $Y_1 \leq Y \leq Y_2$, $X \leq 45$ and $0.9*Y+m \leq X \leq n-k*Y$, wherein $Y_1$ is 0.50 and $Y_2$ is 10, and m is 0.8, n is 70 and k is 4.7; and wherein said polymer composition has a melt flow rate (MFR) which is at least 1.7, and said polymer composition comprises less than 0.05 wt % 2,4-Diphenyl-4-methyl-1-pentene.

The subgroups, properties and embodiments of the crosslinked polymer composition, of the present invention, as will be described herein, apply equally and independently to the power cable insulation and the power cable, both of the present invention, as described herein.

A further embodiment of the present invention discloses a crosslinked polymer composition, wherein said crosslinked polymer composition is obtained by crosslinking a polymer composition, as described herein.

An even further embodiment of the present invention discloses a crosslinked polymer composition which is obtained in a method comprising exposure of a polymer composition, as described herein, to a curing procedure, during which curing procedure said polymer composition is crosslinked.

Crosslinking can be carried out at increased temperature which is chosen, as well known, depending on the type of crosslinking agent. For instance temperatures above 150° C., such as 160 to 350° C., are typical, however without limiting thereto.

A further embodiment of the present invention discloses a crosslinked polymer composition, wherein a polymer composition is exposed to a curing procedure during which the maximum temperature of said polymer composition is, for example, above 150° C., e.g. 160 to 350° C., e.g. less than 280° C., e.g. 250° C. or less, or, for example, 180° C. or less.

An even further embodiment of the present invention discloses a crosslinked polymer composition, wherein a polymer composition is exposed to a curing procedure during which the maximum temperature of said polymer composition is 270° C. or less, 260° C. or less, 250° C. or less, 240° C. or less, 230° C. or less, 220° C. or less, 210° C. or less, 200° C. or less, 190° C. or less, or, alternatively, 180° C. or less.

Still a further embodiment of the present invention discloses a crosslinked polymer composition, wherein a polymer composition is exposed to a curing procedure during which the maximum temperature of said polymer composition is 270° C. or less, 265° C. or less, 260° C. or less, 255° C. or less, 250° C. or less, 245° C. or less, 240° C. or less, 235° C. or less, 230° C. or less, 225° C. or less, 220° C. or less, 215° C. or less, 210° C. or less, 205° C. or less, 200° C. or less, 195° C. or less, 190° C. or less, 185° C. or less, or, alternatively, 180° C. or less.

An even further embodiment of the present invention discloses a crosslinked polymer composition, wherein a polymer composition is exposed to a curing procedure during which the maximum temperature of said polymer composition is 250° C. or less, 245° C. or less, 240° C. or less, 235° C. or less, 230° C. or less, 225° C. or less, 220° C. or less, 215° C. or less, 210° C. or less, 205° C. or less, 200° C. or less, 195° C. or less, 190° C. or less, 185° C. or less, or, alternatively, 180° C. or less.

A further embodiment of the present invention discloses a crosslinked polymer composition, wherein a polymer composition is exposed to a curing procedure during which the maximum temperature of said polymer composition is 180° C. or less.

Still a further embodiment of the present invention discloses a crosslinked polymer composition, wherein a polymer composition is exposed to a curing procedure during which the maximum temperature of said polymer composition is at least 150° C. or, alternatively, at least 160° C.

The crosslinked polymer composition of the present invention may suitably be obtained by crosslinking a polymer composition comprising polyolefin, peroxide and a sulphur containing antioxidant, wherein the amount peroxide corresponds to X mmol —O—O—/kg polymer composition, and the amount sulphur containing antioxidant corresponds to Y mmol —OH/kg polymer composition, wherein X and Y are as defined herein, and the polymer composition comprises less than 0.05 wt % 2,4-Diphenyl-4-methyl-1-pentene and is exposed to a curing procedure during which the maximum temperature of the reaction mixture of polyolefin, peroxide and sulphur containing antioxidant, is less than 280° C., e.g. 250° C. or less, or, for example, 180° C. or less.

Unexpectedly, when the crosslinked polymer composition, of the present invention, has an Oxidation Induction Time, determined according to ASTM-D3895, ISO/CD 11357 AND EN 728, which corresponds to Z minutes, and comprises an amount of peroxide by-products which corresponds to W ppm, determined according to BTM2222 using HPLC, wherein Z and W are as defined herein, the electrical conductivity of the polymer composition are reduced, i.e. lowered. The electrical conductivity of the polymer composition is reduced in comparison to the electrical conductivity of conventional polymer material suitable for power cables.

Unexpectedly, when a crosslinked polymer composition has an Oxidation Induction Time, which corresponds to Z minutes, and comprises an amount of peroxide by-products, which corresponds to W ppm, wherein Z and W are as defined herein, the electrical conductivity of said crosslinked polymer composition is reduced, i.e. lower in comparison to the electrical conductivity of conventional polymer material suitable for power cables.

The crosslinked polymer composition of the present invention, which has an Oxidation Induction Time, which corresponds to Z minutes, and comprises an amount of peroxide by-products, which corresponds to W ppm, wherein Z and W are as defined herein, has surprisingly been obtained by crosslinking a polymer composition, which polymer composition has a melt flow rate (MFR) of at least 1.7 and comprises a polyolefin, peroxide and sulphur containing antioxidant, wherein the amount peroxide corresponds to X mmol —O—O—/kg polymer composition, and the amount sulphur containing antioxidant corresponds to Y mmol —OH/kg polymer composition, wherein X and Y are as defined herein, and the polymer composition comprises less than 0.05 wt % 2,4-Diphenyl-4-methyl-1-pentene and/or exposing to a curing procedure during which the maximum temperature of the reaction mixture of polyolefin, peroxide and sulphur containing antioxidant, is less than 280° C.

The crosslinked polymer composition of the invention has electrical properties expressed i.a. as reduced, i.e. low, electrical conductivity, whereby the undesired heat formation, e.g. in the insulation layer of a power cable, for example, of a DC power cable, can be minimised. The invention is particularly advantageous for DC power cables.

Further, a low oxidation induction time means that the concentration of phenolic groups is low. However, it has shown that this does not necessarily have to be associated with poor thermo oxidative resistance. There is sulphur containing antioxidants that have a limited contribution to the oxidation induction time, but still are able to adequately protect the material against oxidation.

The electrical conductivity is measured herein according to DC conductivity method as described under "Determination Methods". "Reduced" or "low" electrical conductivity as used herein interchangeably mean that the value obtained from the DC conductivity method is low, i.e. reduced.

The low electrical conductivity of the crosslinked polymer composition is very advantageous i.a. in a power cable, for example, in an AC or DC power cable, e.g. in direct current (DC) power cables, for example, in low voltage (LV), medium voltage (MV), high voltage (HV) or extra high voltage (EHV) DC cables, e.g. in DC power cables operating at any voltages, for example, at higher than 320 kV, such as EHV DC cables.

Moreover, the electrical conductivity of the crosslinked polymer composition is surprisingly low even without removing the volatile by-products after crosslinking, i.e. without degassing, compared to electrical conductivity of a non-degassed polymer composition crosslinked with conventional methods. Therefore, if desired, the degassing step of the crosslinked cable containing the crosslinked polymer composition can be considerably shortened and/or affected in less demanding conditions during cable production process which naturally improves the production efficiency. Accordingly, if desired the degassing step during the cable production can be shortened.

In a further embodiment, a crosslinked polymer composition, as described herein, is disclosed wherein $Z_2$ is to 40, or, alternatively, 30 minutes.

In still a further embodiment, a crosslinked polymer composition, as described herein, is disclosed wherein $Z_2$ is 25, 22, 20, 18, 16, 15, 14, 12, 10, 9, or, alternatively, 8.

A further embodiment of the present invention discloses a crosslinked polymer composition, as described herein, wherein $Z_2$ is 15.

An even further embodiment of the present invention discloses a crosslinked polymer composition, as described herein, wherein $Z_2$ is 15, 14, 12, 10, 9, or, alternatively, 8.

Still a further embodiment of the present invention discloses a crosslinked polymer composition, as described herein, wherein $Z_1$ is 1 and $Z_2$ is 20, $Z_1$ is 2 and $Z_2$ is 20, $Z_1$ is 3 and $Z_2$ is 20, or, alternatively, $Z_1$ is 4 and $Z_2$ is 20.

Still an even further embodiment of the present invention discloses a crosslinked polymer composition, as described herein, wherein $Z_1$ is 1 and $Z_2$ is 18, $Z_1$ is 2 and $Z_2$ is 18, $Z_1$ is 3 and $Z_2$ is 18, or, alternatively, $Z_1$ is 4 and $Z_2$ is 18.

A further embodiment of the present invention discloses a crosslinked polymer composition, as described herein, wherein $Z_1$ is 1 and $Z_2$ is 16, $Z_1$ is 2 and $Z_2$ is 16, $Z_1$ is 3 and $Z_2$ is 16, or, alternatively, $Z_1$ is 4 and $Z_2$ is 16.

An even further embodiment of the present invention discloses a crosslinked polymer composition, as described herein, wherein $Z_1$ is 1 and $Z_2$ is 15, $Z_1$ is 2 and $Z_2$ is 15, $Z_1$ is 3 and $Z_2$ is 15, or, alternatively, $Z_1$ is 4 and $Z_2$ is 15.

Still a further embodiment of the present invention discloses a crosslinked polymer composition, as described herein, wherein $Z_1$ is 1 and $Z_2$ is 14, $Z_1$ is 2 and $Z_2$ is 14, $Z_1$ is 3 and $Z_2$ is 14, or, alternatively, $Z_1$ is 4 and $Z_2$ is 14.

A further embodiment of the present invention discloses a crosslinked polymer composition, as described herein, wherein $Z_1$ is 1 and $Z_2$ is 12, $Z_1$ is 2 and $Z_2$ is 12, $Z_1$ is 3 and $Z_2$ is 12, or, alternatively, $Z_1$ is 4 and $Z_2$ is 12.

An even further embodiment of the present invention discloses a crosslinked polymer composition, as described herein, wherein $Z_1$ is 1 and $Z_2$ is 10, $Z_1$ is 2 and $Z_2$ is 10, $Z_1$ is 3 and $Z_2$ is 10, or, alternatively, $Z_1$ is 4 and $Z_2$ is 10.

Still a further embodiment of the present invention discloses a crosslinked polymer composition, as described herein, wherein $Z_1$ is 1 and $Z_2$ is 9, $Z_1$ is 2 and $Z_2$ is 9, $Z_1$ is 3 and $Z_2$ is 9, or, alternatively, $Z_1$ is 4 and $Z_2$ is 9.

A further embodiment of the present invention discloses a crosslinked polymer composition, as described herein, wherein $Z_1$ is 1 and $Z_2$ is 8, $Z_1$ is 2 and $Z_2$ is 8, $Z_1$ is 3 and $Z_2$ is 8, or, alternatively, $Z_1$ is 4 and $Z_2$ is 8.

A further embodiment of the present invention discloses a crosslinked polymer composition, as described herein, wherein $W_1$ is 50, 100, 200, 300, 400 or 500

An even further embodiment of the present invention discloses a crosslinked polymer composition, as described herein, wherein $W_1$ is 50.

A further embodiment of the present invention discloses a crosslinked polymer composition, as described herein, wherein $W_2$ is 9400, 9300, 9200, 9100, 9050 or, alternatively, 9000.

Still a further embodiment of the present invention discloses a crosslinked polymer composition, as described herein, wherein $W_2$ is 9000.

A further embodiment of the present invention discloses a crosslinked polymer composition, as described herein, wherein p is 17000, 16500 or, alternatively, 16000.

Still a further embodiment of the present invention discloses a crosslinked polymer composition, as described herein, wherein p is 16000.

A further embodiment of the present invention discloses a crosslinked polymer composition, as described herein, wherein $Z_1$ is 2, $Z_2$ is 20, $W_2$ is 9000, and p is 16000.

In a further embodiment the crosslinked polymer composition of the present invention is obtained by crosslinking a polymer composition, which polymer composition has a melt flow rate (MFR) of at least 1.7 and comprises a polyolefin, peroxide and sulphur containing antioxidant, wherein the amount peroxide corresponds to X mmol —O—

O—/kg polymer composition, and the amount sulphur containing antioxidant corresponds to Y mmol —OH/kg polymer composition, wherein the "—OH" in "Y mmol —OH/kg polymer composition" is understood to be phenolic —OH, $Y_1 \leq Y \leq Y_2, X \leq 45$ and $0.9*Y+m \leq X \leq n-k*Y$, wherein $Y_1$ is 0.50 and $Y_2$ is 10, and
m is 0.8, n is 70 and k is 4.7; and
said polymer composition comprises less than 0.05 wt % 2,4-Diphenyl-4-methyl-1-pentene.

Further, when said polymer composition is crosslinked it is understood that it may be the polymer composition or the polyolefin, which is comprised in the polymer composition, which is crosslinked with peroxide.

The unit "mmol —O—O—/kg polymer composition" means herein the content (mmol) of peroxide functional groups per kg polymer composition, when measured from the polymer composition prior to crosslinking. For instance the 35 mmol —O—O—/kg polymer composition corresponds to 0.95% by weight (wt %) of the well known dicumyl peroxide based on the total amount (100 wt %) of the polymer composition.

In further embodiments of the present invention, $Y_1$ is 0.50, 1.0, 1.5, 2.0, 2.5 or 3.0.

In still further embodiments of the present invention, $Y_2$ is 10, 9.8, 9.6, 9.4, 9.2, 9.0, 8.8, 8.6, 8.4, 8.2, 8.0, 7.8, 7.6, 7.4, 7.2, 7.0, 6.8, 6.6, 6.5, 6.4, 6.2, 6.1 or 6.0.

In further embodiments of the present invention, $X \leq 45$, $X \leq 40$, $X \leq 38$ or, alternatively, $X \leq 35$.

In even further embodiments of the present invention, m is 0.8, 1.0, 1.5, 2.0, 2.5 or 3.0.

In further embodiments of the present invention, n is 70, 68, 66, 65, 62 or 60.

In even further embodiments of the present invention, k is 4.7, 4.8, 4.9 or 5.0.

In a still even further embodiment of the present invention, $Y_1$ is 2.0, $Y_2$ is 9.0 and $X \leq 35$, and m is 3.0, n is 65 and k is 4.7.

In a still even further embodiment of the present invention, $Y_1$ is 2.0, $Y_2$ is 8.0 and $X \leq 35$, and m is 3.0, n is 65 and k is 4.7.

In a still even further embodiment of the present invention, $Y_1$ is 2.0, $Y_2$ is 7.0 and $X \leq 35$, and m is 3.0, n is 65 and k is 4.7.

In a still even further embodiment of the present invention, $Y_1$ is 2.0, $Y_2$ is 6.0 and $X \leq 35$, and m is 3.0, n is 65 and k is 4.7.

In further embodiments of the present invention, n is 59, 55, 50, 48 or 45.

In still further embodiments of the present invention, m is 5.0 and n is 65, m is 7.0 and n is 65, m is 10.0 and n is 65, or, alternatively, m is 15 and n is 65.

In a further embodiment of the present invention, m is 17 and n is 64.

In an even further embodiment of the present invention, m is 10.0 and n is 65.

In still further embodiments of the present invention, m is 12.0 and n is 63, m is 14.0 and n is 61, m is 16.0 and n is 59, or, alternatively, m is 18.0 and n is 57.

In further embodiments of the present invention, m is 12.0 and n is 61, m is 14.0 and n is 59, m is 16.0 and n is 57, or, alternatively, m is 18.0 and n is 55.

In still even further embodiments of the present invention, m is 14.0 and n is 63, m is 16.0 and n is 61, m is 18.0 and n is 59, or, alternatively, m is 20.0 and n is 57.

Furthermore, the polyolefin may be unsaturated, wherein the peroxide content may depend on the unsaturation degree.

In a further embodiment of the present invention a polymer composition, as described herein, is disclosed, wherein m is 10.0 and n is 60.

In still a further embodiment of the present invention a polymer composition, as described herein, is disclosed, wherein $Y_1$ is 2 and $Y_2$ is 6.5.

In even a further embodiment of the present invention a polymer composition as described herein is disclosed, wherein $Y_1$ is 2.5 and $Y_2$ is 6.0.

Still a further embodiment of the present invention discloses a polymer composition as described herein, wherein said polymer composition has a melt flow rate (MFR) of 1.7 to 2.3.

A further embodiment of the present invention discloses a crosslinked polymer composition as described herein, which is obtained by crosslinking a polymer composition as described herein, wherein said polymer composition comprises less than 0.03 wt % 2,4-Diphenyl-4-methyl-1-pentene.

In still a further embodiment of the present invention a crosslinked polymer composition, as described herein, is disclosed, which is obtained by crosslinking a polymer composition as described herein, wherein said polymer composition comprises less than 0.01 wt % 2,4-Diphenyl-4-methyl-1-pentene.

In an even further embodiment of the present invention a crosslinked polymer composition as described herein is disclosed, which is obtained by crosslinking a polymer composition as described herein, wherein said polymer composition comprises no 2,4-Diphenyl-4-methyl-1-pentene.

Still a further embodiment of the present invention discloses a crosslinked polymer composition as described herein, which is obtained by crosslinking a polymer composition as described herein, wherein said polymer composition comprises neither any crosslinking booster(s) nor any scorch retarder additive(s). Said crosslinking booster(s) is/are understood, in this context, herein, to be low molecular weight crosslinking booster(s).

In a further embodiment of the present invention a polymer composition, as described herein is disclosed, wherein said polymer composition is a crosslinkable polymer composition.

The expressions "the amount peroxide corresponds to X mmol —O—O—/kg polymer composition" the amount sulphur containing antioxidant corresponds to Y mmol —OH/kg polymer composition" and the amount of 2,4-Diphenyl-4-methyl-1-pentene, as described herein, means that the polymer composition before crosslinking contains the polyolefin, peroxide and sulphur containing antioxidant in said amounts.

Still a further embodiment of the present invention discloses a crosslinked polymer composition, which is obtained by crosslinking a polymer composition, as described herein, wherein said polymer composition comprises neither any crosslinking booster(s) nor any scorch retarder additive(s).

The invention is further directed to a crosslinked power cable insulation, for example, to a crosslinked direct current (DC) power cable insulation, comprising a conductor surrounded by one or more layers, wherein at least one of said layer(s) comprises the crosslinked polymer composition, of the present invention, as described herein.

Further, the invention is directed to a crosslinked power cable insulation, for example, to a crosslinked direct current (DC) power cable insulation, e.g., to a crosslinked HV DC or EHV DC power cable insulation, wherein the insulation comprises the crosslinked polymer composition, of the present invention, as described herein.

The invention is further directed to a crosslinked power cable, for example, to a crosslinked direct current (DC) power cable, comprising a conductor surrounded by one or more layers, wherein at least one of said layer(s) comprises the crosslinked polymer composition, of the present invention, as described herein.

Further, the invention is directed to a crosslinked power cable, for example, to a crosslinked direct current (DC) power cable, e.g., to a crosslinked HV DC or EHV DC power cable, comprising a conductor surrounded by at least an inner semiconductive layer, an insulation layer and an outer semiconductive layer, in that order, wherein at least one layer, for example, the insulation layer, comprises the crosslinked polymer composition, of the present invention, as described herein.

The invention is further directed to a crosslinked power cable, for example, to a crosslinked direct current (DC) power cable, comprising a conductor surrounded by one or more layers, wherein at least one of said layer(s) comprises the crosslinked polymer composition, of the present invention, as described herein.

Further, the invention is directed to a crosslinked power cable, for example, to a crosslinked direct current (DC) power cable, e.g., to a crosslinked HV DC or EHV DC power cable, comprising a conductor surrounded by at least an inner semiconductive layer, an insulation layer and an outer semiconductive layer, in that order, wherein at least one layer, for example, the insulation layer, comprises the crosslinked polymer composition, of the present invention, as described herein.

Furthermore, the crosslinked polymer composition of the invention, or, alternatively, the power cable insulation of the invention, has after the crosslinking an electrical conductivity of 45 fS/m or less, when measured according to DC conductivity method as described under "Determination Methods". The crosslinked polymer composition of the invention, or, alternatively, the power cable insulation of the invention, has, in a further embodiment, an electrical conductivity of 40 fS/m or less, in an even further embodiment, from 0.01 to 38 fS/m, and, in still a further embodiment, from 0.5 to 35 fS/m, when measured according to DC conductivity method as described under "Determination Methods".

In further embodiments of the present invention, the crosslinked polymer composition of the invention, or, alternatively, the power cable insulation of the invention, comprises, for example, a crosslinked low density polyethylene (LDPE) polymer, as defined herein and including the exemplified subgroups and embodiments thereof, and has an electrical conductivity of 0.01 to 45 fS/m, for example, 0.01 to 40 fS/m, e.g. 0.01 to 38 fS/m, for example, 0.01 to 35 fS/m, an electrical conductivity 0.01 to 45 fS/m, for example, 0.01 to 40 fS/m, e.g. 0.01 to 38 fS/m, for example, 0.01 to 35 fS/m, 0.1 to 45 fS/m, for example, 0.1 to 40 fS/m, e.g. 0.1 to 38 fS/m, for example, 0.1 to 35 fS/m, 1 to 45 fS/m, for example, 1 to 40 fS/m, e.g. 1 to 38 fS/m, or, for example, 1 to 35 fS/m, when measured according to DC conductivity method as described under "Determination Methods".

Polyolefin Component

The following exemplified embodiments, properties and subgroups of the polyolefin component suitable for the crosslinked polymer composition are generalisable so that they can be used in any order or combination to further define the exemplified embodiments of the crosslinked polymer composition. Moreover, it is evident that the given description applies to the polyolefin before it is crosslinked.

The term polyolefin means both an olefin homopolymer and a copolymer of an olefin with one or more comonomer(s). As well known "comonomer" refers to copolymerisable comonomer units.

The polyolefin can be any polyolefin, such as any conventional polyolefin, which is suitable as a polymer in a layer, for example, an insulating layer, of an electrical cable, e.g., of a power cable.

The polyolefin can be e.g. a commercially available polymer or can be prepared according to or analogously to known polymerisation process described in the chemical literature.

Furthermore, the polyolefin may suitably be a polyethylene produced in a high pressure process, for example, a low density polyethylene LDPE produced in a high pressure process. The meaning of LDPE polymer is well known and documented in the literature. Although the term LDPE is an abbreviation for low density polyethylene, the term is understood not to limit the density range, but covers the LDPE-like high pressure (HP) polyethylenes with low, medium and higher densities. The term LDPE describes and distinguishes only the nature of HP polyethylene with typical features, such as different branching architecture, compared to the PE produced in the presence of an olefin polymerisation catalyst.

The LDPE as said polyolefin may be a low density homopolymer of ethylene (referred herein as LDPE homopolymer) or a low density copolymer of ethylene with one or more comonomer(s) (referred herein as LDPE copolymer). The one or more comonomers of LDPE copolymer may suitably be selected from the polar comonomer(s), non-polar comonomer(s) or from a mixture of the polar comonomer(s) and non-polar comonomer(s), as defined above or below. Moreover, said LDPE homopolymer or LDPE copolymer as said polyolefin may optionally be unsaturated.

As a polar comonomer for the LDPE copolymer as said polyolefin, comonomer(s) containing hydroxyl group(s), alkoxy group(s), carbonyl group(s), carboxyl group(s), ether group(s) or ester group(s), or a mixture thereof, can be used. In a further embodiment, comonomer(s) containing carboxyl and/or ester group(s) are used as said polar comonomer. In still a further embodiment, the polar comonomer(s) of LDPE copolymer is selected from the groups of acrylate(s), methacrylate(s) or acetate(s), or any mixtures thereof. If present in said LDPE copolymer, the polar comonomer(s) may, for example, be selected from the group of alkyl acrylates, alkyl methacrylates or vinyl acetate, or a mixture thereof. In a further embodiment, said polar comonomers may be selected from $C_1$- to $C_6$-alkyl acrylates, $C_1$- to $C_6$-alkyl methacrylates or vinyl acetate. In even a further embodiment, said polar LDPE copolymer is a copolymer of ethylene with $C_1$- to $C_4$-alkyl acrylate, such as methyl, ethyl, propyl or butyl acrylate, or vinyl acetate, or any mixture thereof.

As the non-polar comonomer(s) for the LDPE copolymer as said polyolefin, comonomer(s) other than the above defined polar comonomers can be used. In a further embodiment, the non-polar comonomers are other than comonomer(s) containing hydroxyl group(s), alkoxy group(s), carbonyl group(s), carboxyl group(s), ether group(s) or ester group(s). One group of exemplified non-polar comonomer(s) comprise, may suitably consist of, monounsaturated (= one double bond) comonomer(s), for example, olefins, e.g. alpha-olefins, for example, $C_3$ to $C_{10}$ alpha-olefins, such as propylene, 1-butene, 1-hexene, 4-methyl-1-pentene, styrene, 1-octene, 1-nonene; polyunsaturated (= more than one double bond) comonomer(s); a silane group containing comonomer(s); or any mixtures thereof. The polyunsaturated comonomer(s) are further described below in relation to unsaturated LDPE copolymers.

If the LDPE polymer is a copolymer, it suitably comprises 0.001 to 50 wt.-%, for example, 0.05 to 40 wt.-%, e.g., less than 35 wt.-%, for example, less than 30 wt.-%, e.g., less than 25 wt.-%, of one or more comonomer(s).

The crosslinked polymer composition, suitably the polyolefin component thereof, for example, the LDPE polymer, may optionally be unsaturated, i.e. the crosslinked polymer composition, suitably the polyolefin, for example, the LDPE polymer, may comprise carbon-carbon double bonds. The "unsaturated" means herein that the polymer composition, suitably the polyolefin, (prior to crosslinking of the polymer composition) contains carbon-carbon double bonds/1000 carbon atoms in a total amount of at least 0.1; at least 0.2; at least 0.3 or alternatively, at least 0.4/1000 carbon atoms.

As well known, the unsaturation can be provided to the crosslinked polymer composition i.a. by means of the polyolefin, a low molecular weight (Mw) compound(s), such as crosslinking booster(s) or scorch retarder additive(s), or any combinations thereof. The total amount of double bonds means herein double bonds determined from the source(s) that are known and deliberately added to contribute to the unsaturation. If two or more above sources of double bonds are chosen to be used for providing the unsaturation, then the total amount of double bonds in the crosslinked polymer composition means the sum of the double bonds present in the double-bond sources. It is evident that a characteristic model compound for calibration is used for each chosen source to enable the quantitative infrared (FTIR) determination.

Any double bond measurements are carried out prior to crosslinking.

If the polymer composition is unsaturated prior to crosslinking, then it is suitable that the unsaturation originates at least from an unsaturated polyolefin component. For example, the unsaturated polyolefin is an unsaturated polyethylene, e.g., an unsaturated LDPE polymer, for example, an unsaturated LDPE homopolymer or an unsaturated LDPE copolymer. When polyunsaturated comonomer(s) are present in the LDPE polymer as said unsaturated polyolefin, then the LDPE polymer is an unsaturated LDPE copolymer.

In an embodiment of the present invention the term "total amount of carbon-carbon double bonds" is defined from the unsaturated polyolefin, and refers, if not otherwise specified, to the combined amount of double bonds which originate from vinyl groups, vinylidene groups and trans-vinylene groups, if present. Naturally the polyolefin does not necessarily contain all the above three types of double bonds. However, any of the three types, when present, is calculated to the "total amount of carbon-carbon double bonds". The amount of each type of double bond is measured as indicated under "Determination methods".

If an LDPE homopolymer is unsaturated, then the unsaturation can be provided e.g. by a chain transfer agent (CTA), such as propylene, and/or by polymerisation conditions. If an LDPE copolymer is unsaturated, then the unsaturation can be provided by one or more of the following means: by a chain transfer agent (CTA), by one or more polyunsaturated comonomer(s) or by polymerisation conditions. It is well known that selected polymerisation conditions such as peak temperatures and pressure, can have an influence on the unsaturation level. In case of an unsaturated LDPE copolymer, it is suitably an unsaturated LDPE copolymer of ethylene with at least one polyunsaturated comonomer, and optionally with other comonomer(s), such as polar comonomer(s) which is suitably selected from acrylate or acetate comonomer(s). For example, an unsaturated LDPE copolymer is an unsaturated LDPE copolymer of ethylene with at least polyunsaturated comonomer(s).

The polyunsaturated comonomers suitable for the unsaturated polyolefin consist, for example, of a straight carbon chain with at least 8 carbon atoms and at least 4 carbons between the non-conjugated double bonds, of which at least one is terminal, e.g., said polyunsaturated comonomer is a diene, preferably a diene which comprises at least eight carbon atoms, the first carbon-carbon double bond being terminal and the second carbon-carbon double bond being non-conjugated to the first one. Exemplified dienes are selected from $C_8$ to $C_{14}$ non-conjugated dienes or mixtures thereof, e.g., selected from 1,7-octadiene, 1,9-decadiene, 1,11-dodecadiene, 1,13-tetradecadiene, 7-methyl-1,6-octadiene, 9-methyl-1,8-decadiene, or mixtures thereof. The diene is, for example, selected from 1,7-octadiene, 1,9-decadiene, 1,11-dodecadiene, 1,13-tetradecadiene, or any mixture thereof, however, without limiting to above dienes.

It is well known that e.g. propylene can be used as a comonomer or as a chain transfer agent (CTA), or both, whereby it can contribute to the total amount of the C—C double bonds, for example, to the total amount of the vinyl groups. Herein, when a compound which can also act as comonomer, such as propylene, is used as CTA for providing double bonds, then said copolymerisable comonomer is not calculated to the comonomer content.

If the polyolefin, for example, the LDPE polymer, is unsaturated, then it has, e.g., a total amount of carbon-carbon double bonds, which originate from vinyl groups, vinylidene groups and trans-vinylene groups, if present, of more than 0.1; more than 0.2; more than 0.3; more than 0.4 or, alternatively, more than 0.5/1000 carbon atoms. The upper limit of the amount of carbon-carbon double bonds present in the polyolefin is not limited and may, for example, be less than 5.0/1000 carbon atoms, e.g., less than 3.0/1000 carbon atoms.

In some embodiments, e.g. wherein higher crosslinking level with the low peroxide content is desired, the total amount of carbon-carbon double bonds, which originate from vinyl groups, vinylidene groups and trans-vinylene groups, if present, in the unsaturated LDPE, is suitably higher than 0.50/1000 carbon atoms, suitably higher than 0.60/1000 carbon atoms. Such higher amount of double bonds is suitable e.g. if high cable production speed is desired and/or it would be desirable to minimise or to avoid sagging problems, and/or deformation, which may occur e.g. depending on the desired end application and/or the cable production process. Higher double bond content combined with "low" peroxide content of the invention is also suitable in cable embodiments, such as in DC power cables, where very demanding mechanical and/or heat resistance properties are needed for the layer, for example insulation layer, material.

Further, the polyolefin is, for example, unsaturated and contains at least vinyl groups and the total amount of vinyl groups is, for example, higher than 0.01/1000 carbon atoms, e.g., higher than 0.05/1000 carbon atoms, for example, higher than 0.08/1000 carbon atoms, and, e.g., higher than 0.11/1000 carbon atoms. Furthermore, the total amount of vinyl groups is, for example, lower than 4.0/1000 carbon atoms. The polyolefin, prior to crosslinking, contains vinyl groups in total amount of, for example, more than 0.20/1000 carbon atoms, e.g., more than 0.30/1000 carbon atoms, and, for example, more than 0.40/1000 carbon atoms. In some demanding embodiments, for example, in power cables, e.g., in DC power cables, at least one layer, for example, the insulation layer, comprises LDPE polymer, e.g., LDPE copolymer, which contains vinyl groups in total amount of more than 0.50/1000 carbon atoms.

The unsaturation has shown to further contribute to said desirable balance of low conducitivty and mechanical properties. In an embodiment of the present invention, the polyolefin of the crosslinked polymer composition is an unsaturated LDPE copolymer of ethylene with at least one polyunsaturated comonomer, e.g., a diene as defined above, and optionally with other comonomer(s), and has the total amount of carbon-carbon double bonds, which originate from vinyl groups, vinylidene groups and trans-vinylene groups, if present, as defined above, has, for example, the total amount of vinyl groups as defined above. Said unsaturated LDPE copolymer is highly usable for the method for further reducing the electrical conductivity of the crosslinked polymer composition, for example, of an insulation layer of a power cable, e.g., of a DC power cable.

Typically, and suitably in wire and cable (W&C) applications, the density of the polyolefin, for example, of the LDPE polymer, is higher than 860 kg/m$^3$. The density of the polyolefin, e.g., of the LDPE polymer, the ethylene homo- or copolymer is, for example, not higher than 960 kg/m$^3$, and is, e.g., from 900 to 945 kg/m$^3$. The MFR$_2$ (2.16 kg, 190° C.) of the polyolefin, for example, of the LDPE polymer, e.g., from 0.01 to 50 g/10 min, for example, is from 0.1 to 20 g/10 min, and, e.g., is from 0.2 to 10 g/10 min.

Accordingly, the polyolefin of the invention is, for example, produced at high pressure by free radical initiated polymerisation (referred to as high pressure (HP) radical polymerisation). The HP reactor can be e.g. a well known tubular or autoclave reactor or a mixture of a tubular and an autoclave reactor. In an embodiment of the present invention the HP reactor is a tubular reactor. The polyolefin is, for example, unsaturated LDPE homopolymer or LDPE copolymer of ethylene with one or more comonomer(s), as defined above. The LDPE polymer obtainable by the process of the invention provides, e.g., the advantageous electrical properties as defined above or below. The high pressure (HP) polymerisation and the adjustment of process conditions for further tailoring the other properties of the polyolefin depending on the desired end application are well known and described in the literature, and can readily be used by a skilled person. Suitable polymerisation temperatures range up to 400° C., for example, from 80 to 350° C. and pressure from 70 MPa, for example, 100 to 400 MPa, e.g., from 100 to 350 MPa. Pressure can be measured at least after compression stage and/or after the tubular reactor. Temperature can be measured at several points during all steps.

After the separation the obtained polymer is typically in a form of a polymer melt which is normally mixed and pelletised in a pelletising section, such as pelletising extruder, arranged in connection to the HP reactor system. Optionally, additive(s), such as sulphur containing antioxidant(s), can be added in this mixer in a known manner to result in the crosslinked polymer composition.

Further details of the production of ethylene (co)polymers by high pressure radical polymerisation can be found i.a. in the Encyclopedia of Polymer Science and Engineering, Vol. 6 (1986), pp 383-410 and Encyclopedia of Materials: Science and Technology, 2001 Elsevier Science Ltd.: "Polyethylene: High-pressure, R. Klimesch, D. Littmann and F.-O. Mähling pp. 7181-7184.

When an unsaturated LDPE copolymer of ethylene is prepared, then, as well known, the C—C double bond content can be adjusted by polymerising the ethylene e.g. in the presence of one or more polyunsaturated comonomer(s), chain transfer agent(s), process conditions, or any combinations thereof, e.g. using the desired feed ratio between monomer, for example ethylene, and polyunsaturated comonomer and/or chain transfer agent, depending on the nature and amount of C—C double bonds desired for the unsaturated LDPE copolymer. I.a. WO 9308222 describes a high pressure radical polymerisation of ethylene with polyunsaturated monomers. As a result the unsaturation can be uniformly distributed along the polymer chain in random copolymerisation manner. Also e.g. WO 9635732 describes high pressure radical polymerisation of ethylene and a certain type of polyunsaturated α,ω-divinylsiloxanes.

Polymer Composition

Prior to crosslinking the crosslinked polymer composition, i.e. the polymer composition, comprises at least one peroxide in the presence of sulphur containing antioxidant, and wherein said polymer composition has a melt flow rate (MFR) which is at least 1.7, and in the presence of less than 0.05 wt % 2,4-Diphenyl-4-methyl-1-pentene, wherein the "at least one" peroxide contains at least one —O—O— bond.

Naturally, in case where two or more different peroxide products are used in the polymer composition, then amount (in mmol) of —O—O—/kg polymer composition as defined above, below or in claims is the sum of the amount of —O—O—/kg polymer composition of each peroxide product. As non-limiting examples of suitable organic peroxides, di-tert-amylperoxide, 2,5-di(tert-butylperoxy)-2,5-dimethyl-3-hexyne, 2,5-di(tert-butylperoxy)-2,5-dimethylhexane, tert-butylcumylperoxide, di(tert-butyl)peroxide, dicumylperoxide, butyl-4,4-bis(tert-butylperoxy)-valerate, 1,1-bis(tert-butylperoxy)-3,3,5-trimethylcyclohexane, tert-butylperoxybenzoate, dibenzoylperoxide, bis(tert butylperoxyisopropyl)benzene, 2,5-dimethyl-2,5-di(benzoylperoxy)hexane, 1,1-di(tert-butylperoxy)cyclohexane, 1,1-di(tert amylperoxy)cyclohexane, or any mixtures thereof, can be mentioned. Further, the peroxide is, for example, selected from 2,5-di(tert-butylperoxy)-2,5-dimethylhexane, di(tert-butylperoxyisopropyl)benzene, dicumylperoxide, tert-butylcumylperoxide, di(tert-butyl)peroxide, or mixtures thereof. Furthermore, the peroxide is, e.g., dicumylperoxide.

Further, prior to crosslinking the polymer composition contains, in addition to the polyolefin and the peroxide, sulphur containing antioxidant(s).

Moreover, prior to crosslinking the polymer composition contains less than 0.05 wt % 2,4-Diphenyl-4-methyl-1-pentene.

Additionally, prior to crosslinking the polymer composition may contain, in addition to the polyolefin, The peroxide(s), the sulphur containing antioxidant(s), further component(s) such as polymer component(s) and/or additive(s), exemplified additive(s), such as, stabiliser(s), processing aid(s), flame retardant additive(s), water tree retardant additive(s), acid or ion scavenger(s), inorganic filler(s) and voltage stabiliser(s), as known in the polymer field. The used amounts of additives are conventional and well known to a skilled person, e.g. as already described herein.

The polymer composition comprises typically at least 50 wt %, for example, at least 60 wt %, e.g. at least 70 wt %, e.g., at least 75 wt %, for example, from 80 to 100 wt % and, for example, from 85 to 100 wt %, of the polyolefin based on the total weight of the polymer component(s) present in the polymer composition. The exemplified polymer composition consists of polyolefin as the only polymer component. The expression means that the polymer composition does not contain further polymer components, but the polyolefin as the sole polymer component. However, it is to be understood herein that the polymer composition may comprise further components other than polymer components, such as additives, in line with the additives as already described herein, which may optionally be added in a mixture with a carrier polymer, i.e. in so called master batch.

The polymer composition suitably consist of the polyolefin, for example, polyethylene, e.g., LDPE homo or copolymer, which may optionally be unsaturated before crosslinking, as the sole polyolefin component.

End Uses and End Applications of the Invention

The new crosslinked polymer composition of the invention is highly useful in wide variety of end applications of polymers. Exemplified uses of the crosslinked polymer composition are in W&C applications, for example, in one or more layers of a power cable.

A power cable is defined to be a cable transferring energy operating at any voltage, typically operating at voltages higher than 1 kV. The voltage applied to the power cable can be alternating (AC), direct (DC), or transient (impulse). The crosslinked polymer composition of the invention is very suitable for power cables operating at voltages higher than 320 kV, such cables cover high voltage (HV) and extra high voltage (EHV) power cables which EHV cables operate at even higher voltages, as well known in the field. The above terms have well known meanings and thus indicate the operating level of such cables. For HV DC and EHV DC power cables the operating voltage is defined herein as the electric voltage between ground and the conductor of the high voltage cable. Typically a HV DC power cable and EHV DC power cable operate at voltages of 40 kV or higher, even at voltages of 50 kV or higher. A power cable operating at very high voltages is known in the art as EHV DC power cable which in practice can be as high as, but not limited to, 900 kV.

The crosslinked polymer composition is highly suitable for use as a layer material for an AC or DC power cable, for example, for a direct current (DC) power cable, e.g., for a DC power cable operating at voltages at higher than 320 kV, such as well known HV DC or EHV DC power cable, as defined above.

The insulation layer of the power cable, for example, of the DC power cable, e.g., comprises said crosslinkable unsaturated LDPE copolymer as defined above.

The term "conductor" means herein above and below that the conductor comprises one or more wires. Moreover, the cable may comprise one or more such conductors. For example the conductor is an electrical conductor and comprises one or more metal wires.

As well known the cable can optionally comprise further layers, e.g. layers surrounding the insulation layer or, if present, the outer semiconductive layers, such as screen(s), a jacketing layer, other protective layer(s) or any combinations thereof.

The invention also provides a process for producing a power cable, e.g. a DC power cable, for example, a HV DC or EHV DC power cable, as defined above or in claims comprising a conductor surrounded by one or more layers, for example, at least an insulation layer, e.g., at least an inner semiconductive layer, an insulation layer and an outer semiconductive layer, in that order, wherein the process comprises the steps of applying one or more layers on a conductor wherein at least one layer, for example, the insulation layer, comprises the crosslinked polymer composition, of the invention, as described herein.

In an embodiment of the power cable production process of the invention a power cable is produced by (a) providing and mixing, for example, melt mixing in an extruder, a crosslinkable polymer composition as defined herein, (b) applying at least a melt mix of the polymer composition obtained from step (a), for example, by (co)-extrusion, on a conductor to form one or more layers, e.g., at least an insulation layer, and (c) crosslinking at least the polymer composition, wherein the crosslinked polymer of the invention is comprised in said at least one layer, e.g., in the insulation layer.

For example, in this embodiment a DC power cable, e.g., a HV DC power cable, of the invention comprising a conductor surrounded by an inner semiconductive layer, an insulation layer, and an outer semiconductive layer, in that order, is produced, wherein the process comprises the steps of (a)
  providing and mixing, for example, melt mixing in an extruder, a crosslinkable first semiconductive composition comprising a polymer, a carbon black and optionally further component(s) for the inner semiconductive layer,
  providing and mixing, for example, melt mixing in an extruder, a crosslinkable polymer composition of the invention for the insulation layer,
  providing and mixing, for example, melt mixing in an extruder, a second semiconductive composition which is, e.g., crosslinkable and comprises a polymer, a carbon black and optionally further component(s) for the outer semiconductive layer, (b) applying on a conductor, for example, by coextrusion,
  a melt mix of the first semiconductive composition obtained from step (a) to form the inner semiconductive layer,
  a melt mix of polymer composition of the invention obtained from step (a) to form the insulation layer, and
  a melt mix of the second semiconductive composition obtained from step (a) to form the outer semiconductive layer, and (c) crosslinking at crosslinking conditions one or more of the polymer composition of the insulation layer, wherein the crosslinked polymer of the invention is comprised in the insulation layer, the semiconductive composition of the inner semiconductive layer and the semiconductive composition of the outer semiconductive layer, of the obtained cable, for example, at least the polymer composition of the insulation layer, e.g., the polymer composition of the insulation layer, the semiconductive composition of the inner semiconductive layer and the semiconductive composition of the outer semiconductive layer.

The polymer of the first and the second semiconductive composition is, for example, a polyolefin as described in relation to the crosslinked polymer composition of the invention. The polymer of the first and the second semiconductive composition is, for example, a polyolefin as described in relation to the polymer composition of the invention.

Further, the carbon black of the first and the second semiconductive composition may be any carbon black which is electrically conducting. The carbon black may, suitably, have one or more of the following properties: a) a primary particle size of at least 5 nm which is defined as the number average particle diameter according ASTM D3849-95a, b) iodine number of at least 30 mg/g according to ASTM D1510, c) oil absorption number of at least 30 ml/100 g which is measured according to ASTM D2414. Non limiting examples of suitable carbon blacks include furnace blacks and acetylene blacks.

One example of a group of furnace blacks has a primary particle size of 28 nm or less. The mean primary particle size is defined as the number average particle diameter measured according to ASTM D3849-95a. Furnace blacks of this category, may, for example, have an iodine number between 60 and 300 mg/g according to ASTM D1510. Further, the oil absorption number (of this category) may, for example, be between 50 and 225 ml/100 g, e.g. between 50 and 200 ml/100 g which may be measured according to ASTM D2414.

Another example of a group of furnace blacks has a primary particle size of greater than 28 nm. The mean primary particle size is defined as the number average particle diameter according to ASTM D3849-95a. Furnace blacks of this category may, for example, have an iodine number between 30 and 200 mg/g according to ASTM D1510. Furthermore, the oil absorption number (of this category) may, e.g., be between 80 and 300 ml/100 g measured according to ASTM D2414.

Other suitable carbon blacks can be made by any other process or can be further treated. Suitable carbon blacks for said first and second semiconductive composition may, for example, be characterized by their cleanliness. Therefore, a group of suitable carbon blacks thereof, may have an ash-content of less than 0.2 wt % measured according to ASTM D1506, a 325 mesh sieve residue of less than 30 ppm according to ASTM D1514 and have less than 1 wt % total sulphur according to ASTM D1619.

Furnace carbon black is a generally acknowledged term for the well known carbon black type that is produced in a furnace-type reactor. As examples of carbon blacks, the preparation process thereof and the reactors, reference is made to e.g. EP629222 of Cabot, U.S. Pat. No. 4,391,789, U.S. Pat. No. 3,922,335 and U.S. Pat. No. 3,401,020. As examples of commercial furnace carbon black grades described in ASTM D 1765-98b i.a. N351, N293 and N550, can be mentioned.

Furnace carbon blacks are conventionally distinguished from acetylene carbon blacks which are another suitable carbon black type which may be suitable for a semiconductive composition, Acetylene carbon blacks are produced in a acetylene black process by reaction of acetylene and unsaturated hydrocarbons, e.g. as described in U.S. Pat. No. 4,340,577. A group of suitable acetylene blacks may have a particle size of larger than 20 nm, e.g. 20 to 80 nm. The mean primary particle size is defined as the number average particle diameter according to the ASTM D3849-95a. Further, suitable acetylene blacks of this category have an iodine number between 30 to 300 mg/g, e.g. 30 to 150 mg/g according to ASTM D1510. Furthermore, the oil absorption number (of this category) may, for example, be between 80 to 300 ml/100 g, e.g. 100 to 280 ml/100 g and this is measured according to ASTM D2414. Acetylene black is a generally acknowledged term and are very well known and e.g. supplied by Denka.

Moreover said first and second semiconductive compositions may, for example, be identical.

Melt mixing means mixing above the melting point of at least the major polymer component(s) of the obtained mixture and is typically carried out in a temperature of at least 10-15° C. above the melting or softening point of polymer component(s).

The term "(co)-extrusion" means herein that in case of two or more layers, said layers can be extruded in separate steps, or at least two or all of said layers can be coextruded in a same extrusion step, as well known in the art. The term "(co)-extrusion" means herein also that all or part of the layer(s) are formed simultaneously using one or more extrusion heads. For instance a triple extrusion can be used for forming three layers. In case a layer is formed using more than one extrusion heads, then for instance, the layers can be extruded using two extrusion heads, the first one for forming the inner semiconductive layer and the inner part of the insulation layer, and the second head for forming the outer insulation layer and the outer semiconductive layer.

As well known, the polymer composition and the optional and exemplified first and second semiconductive compositions can be produced before or during the cable production process. Moreover the polymer composition and the optional and exemplified first and second semiconductive composition can each independently comprise part or all of the component(s) thereof before introducing to the (melt) mixing step a) of the cable production process.

The mixing step (a) of the provided polymer composition and of the exemplified first and second semiconductive compositions is, for example, carried out in a cable extruder. The step a) of the Cable production process may optionally comprise a separate mixing step, e.g. in a mixer arranged in connection and preceding the cable extruder of the Cable production line. Mixing in the preceding separate mixer can be carried out by mixing with or without external heating (heating with an external source) of the component(s). In case the peroxide(s), the sulphur containing antioxidant(s) and part or all of the optional further component(s), such as further additive(s), of the polymer composition of the invention and of the optional and exemplified first and second semiconductive compositions, are added to the polyolefin during the Cable production process, then the addition(s) can take place at any stage during the mixing step (a), e.g. at the optional separate mixer preceding the cable extruder or at any point(s) of the cable extruder. The addition of peroxide(s), the sulphur containing antioxidant(s) and optional additive(s) can be made simultaneously or separately as such, suitably in liquid form, or in a well known master batch, and at any stage during the mixing step (a).

In an embodiment of the invention, the peroxide(s), the sulphur containing antioxidant(s) and, for example, also the optional further component(s), such as additive(s), are already present in at least the polymer composition, before it is used in the cable production process and in the production line thereof. The peroxide(s) and the sulphur containing antioxidant(s) can be provided to the pellets of the polyolefin or of the polymer composition before the pellets are provided to the step (a) of the process. The peroxide and the sulphur containing antioxidant(s) can be e.g. melt mixed together with the polyolefin and optional further component(s) and then the melt mix is pelletised, or, for example, can be added, e.g., impregnated, to the solid pellets of the polyolefin or of the polymer composition. The peroxide(s) and the sulphur containing antioxidant(s) are, for example, added in liquid state, i.e. they can be in liquid form at ambient temperature, or are preheated above the melting or glass transition point thereof or dissolved in a carrier medium, as well known to a skilled person. The addition of the optional additive(s) in this embodiment can be made as described above for the peroxide(s) and the sulphur containing antioxidant(s).

The polymer composition and the optional first and second semiconductive composition may, for example, be used in form of powder, grain or pellets when provided to the cable production process. Pellets can be of any size and shape.

Further, the melt mix of the polymer composition may, for example, be obtained from melt mixing step consists of the polyolefin of the invention as the sole polymer component. The optional, and exemplified, additive(s) can be added to polymer composition as such or as a mixture with a carrier polymer, i.e. in a form of so-called master batch.

In an embodiment of the cable production process, a crosslinkable power cable, e.g., a crosslinkable DC power cable, for example, a crosslinkable HV DC power cable, is produced, wherein the insulation layer comprises the polymer composition comprising a crosslinkable polyolefin, optionally, and, e.g., unsaturated an LDPE homo or copolymer, and peroxide(s) and sulphur containing antioxidant(s) in amounts as given above or below, and then the crosslinkable polyolefin in the insulation layer of the obtained cable is crosslinked in step c) in crosslinking conditions. For example, in this embodiment, a crosslinked power cable, for example, a crosslinked DC power cable, e.g., a crosslinked HV DC power cable, is produced, which comprises a conductor surrounded by an inner semiconductive layer comprising, for example, consisting of, a first semiconductive composition, an insulation layer comprising, for example, consisting of, a polymer composition as defined above, and optionally, and e.g., an outer semiconductive layer comprising, for example, consisting of, a second semiconductive composition, wherein at least the polymer composition of the insulation layer, optionally and, e.g., at least one, for example, both, of the first and the second semiconductive composition the inner and, respectively, outer semiconductive layer, is crosslinked at crosslinking conditions in step (c). Crosslinking of the polymer composition of the insulation layer is carried out in the presence of a peroxide in an amount as defined above or in below claims, and the optional crosslinking of the first semiconductive composition of the inner semiconductive, is carried out in the presence of crosslinking agent(s), for example, in the presence of free radical generating agent(s), which is, e.g., a peroxide(s).

The crosslinking agent(s) can already be present in the optional first and second semiconductive composition before introducing to the crosslinking step c) or introduced during the crosslinking step. Peroxide is, for example, used as the crosslinking agent for said optional first and second semiconductive compositions and is, e.g., included to the pellets of semiconductive composition before the composition is used in the cable production process as described above.

Crosslinking can be carried out at temperatures, as already described herein, i.e. the maximum temperature of said polymer composition under the curing procedure during which procedure the polymer composition is crosslinked.

The processing temperatures and devices are well known in the art, e.g. conventional mixers and extruders, such as single or twin screw extruders, are suitable for the process of the invention.

The invention further provides a crosslinked power cable, for example, a crosslinked DC power cable, e.g., a crosslinked HV DC or EHV DC power cable, comprising a conductor surrounded by one or more layers, e.g., at least by an insulation layer, e.g., at least by an inner semiconductive layer, insulation layer and an outer semiconductive layer, in that order, wherein at least the insulation layer comprises the crosslinked polymer composition or any of the subgroups or embodiments thereof as defined above or in claims. Optionally also one or both, for example, both, of the inner semiconductive composition and the outer semiconductive composition are crosslinked.

The invention further provides the use of the crosslinked polymer composition, or any of the exemplified subgroups or embodiments thereof, as defined above or in claims, in at least one layer, for example, in at least an insulation layer, of a crosslinked power cable, e.g., of a crosslinked (DC) power cable, for example, of a crosslinked HV DC or EHV DC power cable, comprising a conductor surrounded by at least one layer, e.g., at least an inner semiconductive layer, insulation layer and an outer semiconductive layer, in that order.

The invention provides also the use of the crosslinked polymer composition, or any of the exemplified subgroups or embodiments thereof, as defined above or in claims, for producing at least one layer, for example, at least an insulation layer, of a crosslinked power cable, e.g. of a crosslinked (DC) power cable, for example, of a crosslinked HV DC or EHV DC power cable, comprising a conductor surrounded by at least one layer, e.g., at least an inner semiconductive layer, insulation layer and an outer semiconductive layer, in that order.

The thickness of the insulation layer of the power cable, for example, of the DC cable, e.g., of the HV DC or EHV DC power cable, is typically 2 mm or more, for example, at least 3 mm, e.g., of at least 5 to 100 mm, for example, from 5 to 50 mm, when measured from a cross section of the insulation layer of the cable.

Determination Methods

Unless otherwise stated in the description or experimental part the following methods were used for the property determinations.

wt %: % by weight

Oxidation Induction Time (OIT) Method

The OIT test is performed according to ASTM-D3895, ISO/CD 11357 and EN 728 using a Differential Scanning Calorimeter (DSC). A circular sample with a diameter of 5 mm and a weight of 5-6 mg of the material (i.e. the crosslinked polymer composition of the present invention) to be tested is introduced into the DSC at room temperature, and the sample is heated to 200° C. (20° C./min) in nitrogen atmosphere. After 5 min stabilisation isothermally at 200° C., the gas is changed from nitrogen to oxygen. The flow rate of oxygen is the same as nitrogen, 50 ml/min. Under these conditions the stabiliser is consumed over time until it is totally depleted. At this point the polymer sample (i.e. the crosslinked polymer composition of the present invention) degrades or oxidizes liberating additional heat (exothermal reaction).

The Oxidation Induction Time (OIT) is defined as the time measured from the oxygen switch on to the onset inflection point for the exothermal reaction occurring when the stabiliser is depleted. Thus OIT is a measure of the thermal stability of the material. Parallel measurements are performed for each condition and mean value is calculated.

Method For Measuring Peroxide By-Products with HPLC

The peroxide by-products are measured according to BTM2222:

Approximately 1 g of a ~1 mm thick compression moulded plaque is immersed in a 1:1 (weight) mixture of isopropanol and cyclohexane for 2 h at 72° C. After filtering, 10 μL are injected on a C18-HPLC column e.g. Zorbax C18-SB (150×4.6 mm). The peroxide by-products are separated using the following gradient:

| Time min. | Flow ml | Water % | Acetonitrile % |
|---|---|---|---|
| 0.0 | 1.0 | 60 | 40 |
| 8.0 | 1.0 | 60 | 40 |
| 15.0 | 1.0 | 0 | 100 |
| 20.0 | 1.0 | 0 | 100 |
| 22.0 | 1.0 | 60 | 40 |
| 29.0 | 1.0 | 60 | 40 |

A UV-detector records the signals at 200 nm. Quantification of the individual substances, such as dicumyl peroxide and the byproducts: acetophenone, cumylalcohol and α-methylstyrene, is based on external calibration using peak areas.

Wt %: % by weight

Melt Flow Rate

The melt flow rate (MFR) is determined according to ISO 1133 and is indicated in g/10 min. The MFR is an indication of the flowability, and hence the processability, of the polymer. The higher the melt flow rate, the lower the viscosity of the polymer. The MFR is determined at 190° C. for polyethylenes and may be determined at different loadings such as 2.16 kg ($MFR_2$) or 21.6 kg ($MFR_{21}$).

Density

The density was measured according to ISO 1183-2. The sample preparation was executed according to ISO 1872-2 Table 3 Q (compression moulding).

Comonomer Contents a) Quantification of alpha-olefin content in linear low density polyethylenes and low density polyethylenes by NMR spectroscopy:

The comonomer content was determined by quantitative 13C nuclear magnetic resonance (NMR) spectroscopy after basic assignment (J. Randall JMS—Rev. Macromol. Chem. Phys., C29(2&3), 201-317 (1989)). Experimental parameters were adjusted to ensure measurement of quantitative spectra for this specific task.

Specifically solution-state NMR spectroscopy was employed using a Bruker AvanceIII 400 spectrometer. Homogeneous samples were prepared by dissolving approximately 0.200 g of polymer in 2.5 ml of deuterated-tetrachloroethene in 10 mm sample tubes utilising a heat block and rotating tube oven at 140° C. Proton decoupled 13C single pulse NMR spectra with NOE (powergated) were recorded using the following acquisition parameters:

a flip-angle of 90 degrees, 4 dummy scans, 4096 transients an acquisition time of 1.6 s, a spectral width of 20 kHz, a temperature of 125° C., a bilevel WALTZ proton decoupling scheme and a relaxation delay of 3.0 s. The resulting FID was processed using the following processing parameters: zero-filling to 32 k data points and apodisation using a gaussian window function; automatic zeroth and first order phase correction and automatic baseline correction using a fifth order polynomial restricted to the region of interest.

Quantities were calculated using simple corrected ratios of the signal integrals of representative sites based upon methods well known in the art.

b) Comonomer content of polar comonomers in low density polyethylene (1) Polymers containing >6 wt % polar comonomer units Comonomer content (wt %) was determined in a known manner based on Fourier transform infrared spectroscopy (FTIR) determination calibrated with quantitative nuclear magnetic resonance (NMR) spectroscopy. Below is exemplified the determination of the polar comonomer content of ethylene ethyl acrylate, ethylene butyl acrylate and ethylene methyl acrylate. Film samples of the polymers were prepared for the FTIR measurement: 0.5-0.7 mm thickness was used for ethylene butyl acrylate and ethylene ethyl acrylate and 0.10 mm film thickness for ethylene methyl acrylate in amount of >6 wt %. Films were pressed using a Specac film press at 150° C., approximately at 5 tons, 1-2 minutes, and then cooled with cold water in a not controlled manner. The accurate thickness of the obtained film samples was measured.

After the analysis with FTIR, base lines in absorbance mode were drawn for the peaks to be analysed. The absorbance peak for the comonomer was normalised with the absorbance peak of polyethylene (e.g. the peak height for butyl acrylate or ethyl acrylate at 3450 $cm^{-1}$ was divided with the peak height of polyethylene at 2020 $cm^{-1}$). The NMR spectroscopy calibration procedure was undertaken in the conventional manner which is well documented in the literature, explained below.

For the determination of the content of methyl acrylate a 0.10 mm thick film sample was prepared. After the analysis the maximum absorbance for the peak for the methylacrylate at 3455 $cm^{-1}$ was subtracted with the absorbance value for the base line at 2475 $cm^{-1}$ ($A_{methylacrylate}-A_{2475}$). Then the maximum absorbance peak for the polyethylene peak at 2660 $cm^{-1}$ was subtracted with the absorbance value for the base line at 2475 $cm^{-1}$ ($A_{2660}-A_{2475}$). The ratio between ($A_{methylacrylate}-A_{2475}$) and ($A_{2660}-A_{2475}$) was then calculated in the conventional manner which is well documented in the literature.

The weight-% can be converted to mol-% by calculation. It is well documented in the literature.

Quantification of Copolymer Content in Polymers by NMR Spectroscopy

The comonomer content was determined by quantitative nuclear magnetic resonance (NMR) spectroscopy after basic assignment (e.g. "NMR Spectra of Polymers and Polymer Additives", A. J. Brandolini and D. D. Hills, 2000, Marcel Dekker, Inc. New York). Experimental parameters were adjusted to ensure measurement of quantitative spectra for this specific task (e.g "200 and More NMR Experiments: A Practical Course", S. Berger and S. Braun, 2004, Wiley-VCH, Weinheim). Quantities were calculated using simple corrected ratios of the signal integrals of representative sites in a manner known in the art.

(2) Polymers Containing 6 wt % or Less Polar Comonomer Units

Comonomer content (wt %) was determined in a known manner based on Fourier transform infrared spectroscopy (FTIR) determination calibrated with quantitative nuclear magnetic resonance (NMR) spectroscopy. Below is exemplified the determination of the polar comonomer content of ethylene butyl acrylate and ethylene methyl acrylate. For the FT-IR measurement a film samples of 0.05 to 0.12 mm thickness were prepared as described above under method 1). The accurate thickness of the obtained film samples was measured.

After the analysis with FT-IR base lines in absorbance mode were drawn for the peaks to be analysed. The maximum absorbance for the peak for the comonomer (e.g. for methylacrylate at 1164 $cm^{-1}$ and butylacrylate at 1165 $cm^{-1}$) was subtracted with the absorbance value for the base line at 1850 $cm^{-1}$ ($A_{polar\ comonomer}$–$A_{1850}$). Then the maximum absorbance peak for polyethylene peak at 2660 $cm^{-1}$ was subtracted with the absorbance value for the base line at 1850 $cm^{-1}$ ($A_{2660}$–$A_{1850}$). The ratio between ($A_{comonomer}$–$A_{1850}$) and ($A_{2660}$–$A_{1850}$) was then calculated. The NMR spectroscopy calibration procedure was undertaken in the conventional manner which is well documented in the literature, as described above under method 1).

The weight-% can be converted to mol-% by calculation. It is well documented in the literature.

PENT (Pennsylvania Notch Test) The resistance to slow crack growth was assessed using the Pennsylvania Notch Test (PENT) according to ISO 16241:2005 with some modifications.

A compression moulded plaque of each material was produced according to the following procedure. Granules were heated in a closed mould at 180° C. for 15 minutes without pressure. The heat was turned off and a nominal pressure of 1.7 MPa was applied for 12.5 hours while the sample and mould were left to cool down naturally.

Dimensions of test piece: 60 mm×25 mm×10 mm
Principal notch: 3.5 mm deep
Side notches: 0.7 mm deep
Test temperature of test pieces: 70° C.
Test stress (calculated on the un-notched cross-sectional area): 2.0 MPa
2 test pieces per material
The time to failure was recorded, and the average from 2 test pieces calculated.

Crystallinity and melting temperature was measured with DSC using a TA Instruments Q2000. The temperature program used was starting at 30° C., heating to 180° C., an isotherm at 180° C. for 2 min and then cooling to –15° C., an isotherm at –15° C. for 2 min and then heating to 180° C. The heating and cooling rates are 10° C./min.

Samples which are cross linked were all cross-linked at 180° C. for 10 min and then degassed in vacuum at 70° C. over night to remove all peroxide by-products before the crystallinity and melt temperature was measured.

Melting temperature, $T_m$, is the temperature where the heat flow to the sample is at its maximum.

The degree of crystallinity, Crystallinity %,=100×ΔHf/ΔH 100% where ΔH100% (J/g) is 290.0 for PE (L. Mandelkem, Macromolecular Physics, Vol. 1-3, Academic Press, New York 1973, 1976 & 1980) The evaluation of crystallinity was done from 20° C.

DC Conductivity Method

The plaques are compression moulded from pellets of the test polymer composition. The final plaques consist of the test polymer composition and have a thickness of 1 mm and a diameter of 260 mm.

The final plaques are prepared by press-moulding at 130° C. for 600 s and 20 MPa. Thereafter the temperature is increased and reaches 180° C. or 250° C. after 5 min. The temperature is then kept constant at 180° C. or 250° C. for 1000 s during which the plaque becomes fully crosslinked by means of the peroxide present in the test polymer composition. Finally the temperature is decreased using the cooling rate 15° C./min until room temperature is reached when the pressure is released.

A high voltage source is connected to the upper electrode, to apply voltage over the test sample. The resulting current through the sample is measured with an electrometer/picoammeter. The measurement cell is a three electrodes system with brass electrodes placed in an heating oven circulated with dried compressed air to maintain a constant humidity level.

The diameter of the measurement electrode is 100 mm. Precautions have been made to avoid flashovers from the round edges of the electrodes.

The applied voltage was 30 kV DC meaning a mean electric field of 30 kV/mm. The temperature was 70° C. The current through the plaque was logged throughout the whole experiments lasting for 24 hours. The current after 24 hours was used to calculate the conductivity of the insulation.

This method and a schematic picture of the measurement setup for the conductivity measurements has been thoroughly described in publications presented at Nordic Insulation Symposium 2009 (Nord-IS 09), Gothenburg, Sweden, Jun. 15-17, 2009, page 55-58: Olsson et al, "Experimental determination of DC conductivity for XLPE insulation".

Nordic Insulation Symposium 2013 (Nord-IS 13), Trondheim, Norway, Jun. 9-12, 2013, page 161-164: Andersson et al, "Comparison of test setups for high field conductivity of HVDC insulation materials".

Method for Determination of the Amount of Double Bonds in the Polymer Composition or in the Polymer A) Quantification of the Amount of Carbon-Carbon Double Bonds by IR Spectroscopy Quantitative infrared (IR) spectroscopy was used to quantify the amount of carbon-carbon doubles (C=C) bonds. Calibration was achieved by prior determination of the molar extinction coefficient of the C=C functional groups in representative low molecular weight model compounds of known structure.

The amount of each of these groups (N) was defined as number of carbon-carbon double bonds per thousand total carbon atoms (C=C/1000C) via:

$$N \alpha (A \times 14)/(E \times L \times D)$$

where A is the maximum absorbance defined as peak height, E the molar extinction coefficient of the group in question ($l \cdot mol^{-1} \cdot mm^{-1}$), L the film thickness (mm) and D the density of the material ($g \cdot cm^{-1}$).

The total amount of C=C bonds per thousand total carbon atoms can be calculated through summation of N for the individual C=C containing components.

For polyethylene samples solid-state infrared spectra were recorded using a FTIR spectrometer (Perkin Elmer 2000) on compression moulded thin (0.5-1.0 mm) films at a resolution of 4 $cm^{-1}$ and analysed in absorption mode.

All quantification was undertaken using the absorption of the C=C—H out-of-plain bend between 910 and 960 cm–1. The specific wave number of the absorption was dependant on the chemical structure of the unsaturation containing species.

1) Polymer Compositions Comprising Polyethylene Homopolymers and Copolymers, Except Polyethylene Copolymers with >0.4 wt % Polar Comonomer For polyethylenes three types of C=C containing functional groups were quantified, each with a characteristic absorption and each calibrated to a different model compound resulting in individual extinction coefficients:

vinyl (R—CH=CH2) via 910 cm$^{-1}$ based on 1-decene [dec-1-ene] giving E=13.13 l·mol$^{-1}$·mm$^{-1}$ vinylidene (RR'C=CH2) via 888 cm$^{-1}$ based on 2-methyl-1-heptene [2-methyhept-1-ene] giving E=18.24·mol$^{-1}$·mm$^{-1}$ trans-vinylene (R—CH=CH—R') via 965 cm$^{-1}$ based on trans-4-decene [(E)-dec-4-ene] giving E=15.14 l·mol$^{-1}$·mm$^{-1}$ For polyethylene homopolymers or copolymers with <0.4 wt % of polar comonomer linear baseline correction was applied between approximately 980 and 840 cm$^{-1}$.

2) Polymer Compositions Comprising Polyethylene Copolymers with >0.4 wt % Polar Comonomer For polyethylene copolymers with >0.4 wt % of polar comonomer two types of C=C containing functional groups were quantified, each with a characteristic absorption and each calibrated to a different model compound resulting in individual extinction coefficients:

vinyl (R—CH=CH2) via 910 cm$^{-1}$ based on 1-decene [dec-1-ene] giving E=13.13·mol$^{-1}$·mm$^{-1}$ vinylidene (RR'C=CH2) via 888 cm$^{-1}$ based on 2-methyl-1-heptene [2-methyhept-1-ene] giving E=18.24 l·mol$^{-1}$

EBA:

For poly(ethylene-co-butylacrylate) (EBA) systems linear baseline correction was applied between approximately 920 and 870 cm$^{-1}$.

EMA:

For poly(ethylene-co-methylacrylate) (EMA) systems linear baseline correction was applied between approximately 930 and 870 cm$^{-1}$.

3) Polymer Compositions Comprising Unsaturated Low Molecular Weight Molecules

For systems containing low molecular weight C=C containing species direct calibration using the molar extinction coefficient of the C=C absorption in the low molecular weight species itself was undertaken.

B) Quantification of Molar Extinction Coefficients by IR Spectroscopy

The molar extinction coefficient was determined according to the procedure given in ASTM D3124-98 and ASTM D6248-98. Solution-state infrared spectra were recorded using a FTIR spectrometer (Perkin Elmer 2000) equipped with a 0.1 mm path length liquid cell at a resolution of 4 cm$^{-1}$.

The molar extinction coefficient (E) was determined as l·mol$^{-1}$·mm$^{-1}$ via:

$$E=A/(C \times L)$$

where A is the maximum absorbance defined as peak height, C the concentration (mol·l$^{-1}$) and L the cell thickness (mm).

At least three 0.18 mol·l$^{-1}$ solutions in carbondisulphide (CS$_2$) were used and the mean value of the molar extinction coefficient determined. For a,w-divinylsiloxanes the molar extinction coefficient was assumed to be comparable to that of <insert small molecule here>.

Alternative Description of the Method for Determination of the Amount of Double Bonds in the Polymer Composition or in the Polymer Quantification of the Amount of Carbon-Carbon Double Bonds by IR Spectroscopy Quantitative infrared (IR) spectroscopy was used to quantify the amount of carbon-carbon double bonds (C=C). Specifically solid-state transmission FTIR spectroscopy was used (Perkin Elmer 2000). Calibration was achieved by prior determination of the molar extinction coefficient of the C=C functional groups in representative low molecular weight model compounds of know structure.

The amount of a given C=C functional group containing species (N) was defined as number of carbon-carbon double bonds per thousand total carbon atoms (C=C/1000C) according to:

$$N=(A \times 14)/(E \times L \times D)$$

were A is the maximum absorbance defined as peak height, E the molar extinction coefficient of the group in question (l·mol$^{-1}$·mm$^{-1}$), L the film thickness (mm) and D the density of the material (g·cm$^{-1}$).

For systems containing unsaturation three types of C=C containing functional groups were considered, each with a characteristic C=C—H out-of-plain bending vibrational mode, and each calibrated to a different model compound resulting in individual extinction coefficients:

vinyl (R—CH=CH2) via at around 910 cm−1 based on 1-decene [dec-1-ene] giving E=13.13 l·mol·l·mm-1 vinylidene (RR'C=CH2) at around 888 cm−1 based on 2-methyl-1-heptene [2-methyhept-1-ene] giving E=18.24 l·mol·l·mm-1 trans-vinylene (R—CH=CH—R') at around 965 cm−1 based on trans-4-decene [(E)-dec-4-ene] giving E=15.14 l·mol·l·mm-1

The specific wavenumber of this absorption was dependant on the specific chemical structure of the species. When non-aliphatic unsaturated group were addressed the molar extinction coefficient was taken to be the same as that of their related aliphatic unsaturated group, as determined using the aliphatic small molecule analogue.

The molar extinction coefficient was determined according to the procedure given in ASTM D3124-98 and ASTM D6248-98. Solution-state infrared spectra were recorded on standard solutions using a FTIR spectrometer (Perkin Elmer 2000) equipped with a 0.1 mm path length liquid cell at a resolution of 4 cm$^{-1}$. The molar extinction coefficient (E) was determined as l·mol$^{-1}$·mm$^{-1}$ via:

$$E=A/(C \times L)$$

were A is the maximum absorbance defined as peak height, C the concentration (mol·l$^{-1}$) and L the cell thickness (mm). At least three 0.18 mol·l$^{-1}$ solutions in carbondisulphide (CS$_2$) were used and the mean value of the molar extinction coefficient determined.

EXPERIMENTAL PART

Preparation of Polymers of the Examples of the Present Invention and the Comparative Example All polymers were low density polyethylenes produced in a high pressure reactor. As to CTA feeds, e.g. the PA content can be given as liter/hour or kg/h and converted to either units using a density of PA of 0.807 kg/liter for the recalculation.

LDPE1:

Ethylene with recycled CTA was compressed in a 5-stage precompressor and a 2-stage hyper compressor with intermediate cooling to reach initial reaction pressure of ca 2628 bar. The total compressor throughput was ca 30 tons/hour. In the compressor area approximately 4.9 liters/hour of propion aldehyde (PA, CAS number: 123-38-6) was added together with approximately 81 kg propylene/hour as chain transfer agents to maintain an MFR of 1.89 g/10 min. Here also 1,7-octadiene was added to the reactor in amount of 27 kg/h. The compressed mixture was heated to 157° C. in a preheating section of a front feed two-zone tubular reactor with an inner diameter of ca 40 mm and a total length of 1200 meters. A mixture of commercially available peroxide radical initiators dissolved in isododecane was injected just after the preheater in an amount sufficient for the exothermal polymerisation reaction to reach peak temperatures of ca 275° C. after which it was cooled to approximately 200° C. The subsequent 2nd peak reaction temperature was 264° C. The reaction mixture was depressurised by a kick valve, cooled and polymer was separated from unreacted gas.

LDPE2:

Ethylene with recycled CTA was compressed in a 5-stage precompressor and a 2-stage hyper compressor with intermediate cooling to reach initial reaction pressure of ca 2904 bar. The total compressor throughput was ca 30 tons/hour. In the compressor area approximately 105 kg propylene/hour was added as chain transfer agents to maintain an MFR of 1.89 g/10 min. Here also 1,7-octadiene was added to the reactor in amount of 62 kg/h. The compressed mixture was heated to 159° C. in a preheating section of a front feed three-zone tubular reactor with an inner diameter of ca 40 mm and a total length of 1200 meters. A mixture of commercially available peroxide radical initiators dissolved in isododecane was injected just after the preheater in an amount sufficient for the exothermal polymerisation reaction to reach peak temperatures of ca 289° C. after which it was cooled to approximately 210° C. The subsequent $2^{nd}$ and $3^{rd}$ peak reaction temperatures were 283° C. and 262° C. respectively with a cooling in between to 225° C. The reaction mixture was depressurised by a kick valve, cooled and polymer was separated from unreacted gas.

The components of the crosslinked polymer compositions of inventive examples (INV.Ex.) 1 to 9, reference example (Ref Ex.) 1 (not crosslinked) and Ref Ex. 2 to 9 (represents the prior art polymer composition crosslinked with a conventional amount of peroxide) and the properties and experimental results of the compositions are given in table 1. The used additives are commercially available:

Peroxide: DCP=dicumyl peroxide ((CAS no. 80-43-3)

Sulphur containing antioxidants: 4,4'-thiobis (2-tertbutyl-5-methylphenol) (CAS number: 96-69-5).

Additive: 2,4-Diphenyl-4-methyl-1-pentene (CAS-no. 6362-80-7).

The amount of DCP is given in mmol of the content of —O—O— functional group per kg polymer composition. The amounts are also given in brackets as weight % (wt %).

TABLE 1

The properties of the crosslinked compositions of the inventive and reference examples:

| CROSSLINKED POLYMER COMPOSITION: | Ref. Ex. 1 | Ref. Ex. 2 | Ref. Ex. 3 | Ref. Ex. 4 | Ref. Ex. 5 | INV. Ex. 1 | INV. Ex. 2 |
|---|---|---|---|---|---|---|---|
| Polyolefin | LDPE1 | LDPE1 | LDPE1 | LDPE1 | LDPE1 | LDPE1 | LDPE1 |
| DCP (wt %) | 0 | 0.55 | 0.55 | 0.55 | 0.55 | 0.55 | 0.55 |
| mmol of —O—O—/kg polymer composition | 0 | 20 | 20 | 20 | 20 | 20 | 20 |
| 4,4'-thiobis (2-tertbutyl-5-methylphenol) (antioxidant) (wt %) | 0.08 | 0.08 | 0.08 | 0.08 | 0.08 | 0.08 | 0.08 |
| mmol of phenolic —OH/kg polymer composition | 4.5 | 4.5 | 4.5 | 4.5 | 4.5 | 4.5 | 4.5 |
| 2,4-Diphenyl-4-methyl-1-pentene (wt %) | 0 | 0.05 | 0.05 | 0.1 | 0.1 | 0 | 0 |
| Cross-linking temp [° C.] | 180 | 180 | 250 | 180 | 250 | 180 | 250 |
| Oxidation Induction Time, determined according to ASTM-D3895, ISO/CD 11357 AND EN 728 [minutes] | 80 | 22 | 41 | 33 | 50 | 7 | 11 |
| Amount of peroxide by-products [ppm] | 0 | 5500 | 5500 | 5500 | 5500 | 5500 | 5500 |
| Conductivity at 30 kV/mm and 70° C. (Not degassed) [fS/m] | 30 | 24 | 41 | 27 | 45 | 6.5 | 18 |

| CROSSLINKED POLYMER COMPOSITION: | INV. Ex. 3 | INV. Ex. 4 | INV. Ex. 5 | INV. Ex. 6 | INV. Ex. 7 | INV. Ex. 8 | INV. Ex. 9 | INV. Ex 10 |
|---|---|---|---|---|---|---|---|---|
| Polyolefin | LDPE2 | LDPE2 | LDPE2 | LDPE2 | LDPE2 | LDPE2 | LDPE2 | LDPE2 |
| DCP (wt %) | 0.3 | 0.5 | 0.7 | 0.9 | 0.3 | 0.5 | 0.7 | 0.9 |
| mmol of —O—O—/kg polymer composition | 11 | 19 | 26 | 33 | 11 | 19 | 26 | 33 |
| 4,4'-thiobis (2-tertbutyl-5-methylphenol) (antioxidant) (wt %) | 0.08 | 0.08 | 0.08 | 0.08 | 0.08 | 0.08 | 0.08 | 0.08 |
| mmol of phenolic —OH/kg polymer composition | 4.5 | 4.5 | 4.5 | 4.5 | 4.5 | 4.5 | 4.5 | 4.5 |
| 2,4-Diphenyl-4-methyl-1-pentene (wt %) | 0 | 0 | 0 | 0 | 0 | 0 | 0 | 0 |
| Cross-linking temp [° C.] | 180 | 180 | 180 | 180 | 250 | 250 | 250 | 250 |
| Oxidation Induction Time, determined according to ASTM-D3895, ISO/CD 11357 AND EN 728 [minutes] | 12 | 8 | 4 | 2 | 17 | 15 | 11 | 11 |
| Amount of peroxide by-products [ppm] | 3000 | 5000 | 7000 | 9000 | 3000 | 5000 | 7000 | 9000 |
| Conductivity at 30 kV/mm and 70° C. (Not degassed) [fS/m] | 5.3 | 8.3 | 8.6 | 11.4 | 7.9 | 14.5 | 19.5 | 25.8 |

| CROSSLINKED POLYMER COMPOSITION: | INV. Ex. 11 | INV. Ex. 12 | INV. Ex. 13 | INV. Ex. 14 | INV. Ex. 15 | INV. Ex 16 |
|---|---|---|---|---|---|---|
| Polyolefin | LDPE1 | LDPE1 | LDPE1 | LDPE1 | LDPE1 | LDPE1 |
| DCP (wt %) | 0.5 | 0.7 | 0.9 | 0.5 | 0.7 | 0.9 |
| mmol of —O—O—/kg polymer composition | 19 | 26 | 33 | 19 | 26 | 33 |
| 4,4'-thiobis (2-tertbutyl-5-methylphenol) (antioxidant) (wt %) | 0.08 | 0.08 | 0.08 | 0.08 | 0.08 | 0.08 |
| mmol of phenolic —OH/kg polymer composition | 4.5 | 4.5 | 4.5 | 4.5 | 4.5 | 4.5 |
| 2,4-Diphenyl-4-methyl-1-pentene (wt %) | 0 | 0 | 0 | 0 | 0 | 0 |
| Cross-linking temp [° C.] | 180 | 180 | 180 | 250 | 250 | 250 |

TABLE 1-continued

The properties of the crosslinked compositions of the inventive and reference examples:

| | | | | | | |
|---|---|---|---|---|---|---|
| Oxidation Induction Time, determined according to ASTM-D3895, ISO/CD 11357 AND EN 728 [minutes] | 5 | 7 | 5 | 9 | 8 | 6 |
| Amount of peroxide by-products [ppm] | 5000 | 7000 | 9000 | 5000 | 7000 | 9000 |
| Conductivity at 30 kV/mm and 70° C. (Not degassed) [fS/m] | 6 | 11 | 9 | 15 | 22 | 26 |

| POLYMER COMPOSITION: | INV. Ex. 17 | REF. Ex. 6 | INV. Ex. 18 |
|---|---|---|---|
| Polyolefin | LDPE1 | LDPE1 | LDPE1 |
| DCP (wt %) | 0.6 | 0.5 | 0.5 |
| mmol of —O—O—/kg polymer composition | 22 | 19 | 19 |
| 4,4'-thiobis (2-tertbutyl-5-methylphenol) (antioxidant) (wt %) | 0.05 | 0.05 | 0.05 |
| mmol of phenolic —OH/kg polymer composition | 2.8 | 2.8 | 2.8 |
| 2,4-Diphenyl-4-methyl-1-pentene (wt %) | 0 | 0.05 | 0 |
| Cross-linking temp [° C.] | 180 | 180 | 250 |
| Oxidation Induction Time, determined according to ASTM-D3895, ISO/CD 11357 AND EN 728 [minutes] | 6 | 12 | 14 |
| Conductivity at 30 kV/mm and 70° C. (Not degassed) [fS/m] | 22.8 | 43.3 | 32.5 |

| POLYMER COMPOSITION: | Ref. Ex. 8 | Ref Ex. 9 |
|---|---|---|
| Polyolefin | LDPE1 | LDPE1 |
| DCP (wt %) | 0.7 | 1.15 |
| mmol of —O—O—/kg polymer composition | 26 | 42 |
| 4,4'-thiobis (2-tertbutyl-5-methylphenol) (antioxidant) (wt %) | 0.08 | 0.08 |
| mmol of phenolic —OH/kg polymer composition | 4.5 | 4.5 |
| 2,4-Diphenyl-4-methyl-1-pentene (wt %) | 0.18 | 0.29 |
| Cross-linking temp [° C.] | 180 | 180 |
| Conductivity measured on cross-linked samples at 30 kV/mm and 70° C. (Not degassed) [fS/m] | 30 | 48 | wt %-values given in the table base on the total amount of the polymer composition.

TABLE 2

Properties of the polyolefin components

| Base Resin Properties | LDPE1 | LDPE2 |
|---|---|---|
| MFR 2.16 kg, at 190° C. [g/10 min] | 1.89 | 1.89 |
| Density [kg/m$^3$] | 923 | 921 |
| Vinyl [C=C/1000 C.] | 0.54 | 0.82 |
| Vinylidene [C=C/1000 C.] | 0.16 | 0.2 |
| Trans-vinylene [C=C/1000 C.] | 0.06 | 0.09 |
| Crystallinity [%] | 48.8 | 43.9 |
| Melting point, $T_m$ [° C.] | 110.2 | 109.3 |

Table 1 shows that the electrical conductivity of the inventive crosslinked polymer compositions (INV.Ex. 1-18) is markedly reduced compared to the reference examples (Ref. Ex. 2-9).

The mechanical properties expressed as PENT for INV Ex. 1 and 6, both more than 3340 hours, remain in a level comparable to the PENT levels of the Ref 8 and 9 being more than 1635 hours and 795 hours, respectively.

The invention claimed is:

1. A crosslinked polymer composition,
wherein the crosslinked polymer composition is formed by crosslinking a polymer composition, wherein the polymer composition has a melt flow rate (MFR) of at least 1.7 and comprises a polyolefin, a peroxide, and a sulfur containing antioxidant, wherein the sulfur containing antioxidant is phenolic, and wherein the polymer composition comprises from 0.03% by weight (wt %) to 0% by weight 2,4-diphenyl-4-methyl-1-pentene;
wherein the crosslinked polymer composition has an Oxidation Induction Time of Z minutes determined according to ASTM-D3895, ISO/CD 11357 and EN 728 using a Differential Scanning calorimeter (DSC), wherein $0 \leq Z \leq 60$;
wherein the crosslinked polymer composition comprises an amount of peroxide by-products, the amount of peroxide by-products being W ppm determined according to BTM2222 using HPLC, wherein the amount of peroxide by-products of the crosslinked polymer composition satisfies both the following equations: $0 \leq W \leq 9000$ and $W \leq 18500-270*Z$; and
wherein the polyolefin is a low density polyethylene (LDPE) comprising an optionally unsaturated LDPE homopolymer or an optionally unsaturated LDPE comonomer of ethylene with one or more comonomer(s).

2. The crosslinked polymer composition according to claim 1, wherein $2 \leq Z \leq 20$; and $W \leq 16000-270*Z$.

3. The crosslinked polymer composition according to claim 1, wherein the amount of the peroxide in the polymer composition corresponds to X mmol —O—O—/kg polymer composition, and the amount of the sulfur containing antioxidant corresponds to Y mmol —OH/kg polymer composition, wherein the amount of the peroxide in the polymer composition and the amount of the sulfur containing antioxidant in the crosslinked polymer composition satisfy each of the following equations: $0.50 \leq Y \leq 10$, $X \leq 45$, and $0.9*Y+0.8 \leq X \leq 70-4.7*Y$.

4. The crosslinked polymer composition according to claim 1, wherein the polymer composition is exposed to a curing procedure during which the maximum temperature of said polymer composition is above 150° C.

5. The crosslinked polymer composition according to claim 1, wherein the polyolefin is an unsaturated LDPE copolymer of ethylene with at least one polyunsaturated comonomer and optionally with one or more other comonomer(s), wherein the polyunsaturated comonomer comprises a straight carbon chain with at least 8 carbon atoms and at least 4 carbons between the non-conjugated double bonds, of which at least one is terminal.

6. The crosslinked polymer composition according to claim 1, wherein the crosslinked polymer composition has an electrical conductivity of 45 fS/m or less, when measured according to DC conductivity method as described under "Determination Methods".

7. The crosslinked polymer composition according to claim 1, wherein the crosslinked polymer composition has an electrical conductivity of 40 fS/m or less, when measured according to DC conductivity method as described under "Determination Methods".

8. A power cable insulation comprising the crosslinked polymer composition according to claim 1.

9. The power cable insulation according to claim 8, wherein the power cable insulation is an HV DC power cable insulation or an EHV DC power cable insulation.

10. The power cable insulation according to claim 8, wherein the power cable insulation has an electrical conductivity of 45 fS/m or less, when measured according to DC conductivity method as described under "Determination Methods".

11. The power cable insulation according to claim 8, wherein the power cable insulation has an electrical conductivity of 40 fS/m or less, when measured according to DC conductivity method as described under "Determination Methods".

12. A power cable comprising the power cable insulation according to claim 8.

13. The power cable of claim 12, wherein the power cable is an HV power cable or an EHV DC power cable.

14. A crosslinked power cable comprising a conductor surrounded by at least an inner semiconductive layer, an insulation layer and an outer semiconductive layer, in that order, wherein at least the insulation layer comprises the crosslinked polymer composition of claim 1.

15. The crosslinked polymer composition of claim 5, wherein said polyunsaturated comonomer is a diene which comprises at least eight carbon atoms, the first carbon-carbon double bond being terminal and the second carbon-carbon double bond being non-conjugated to the first one.

16. The crosslinked polymer composition of claim 15, wherein the diene is selected from the group consisting of $C_8$ to $C_{14}$-non-conjugated dienes and mixtures thereof.

17. The crosslinked polymer composition of claim 16, wherein the diene is selected from the group consisting of: 1,7-octadiene, 1,9-decadiene, 1,11-dodecadiene, 1,13-tetradecadiene, 7-methyl-1,6-octadiene, 9-methyl-1,8-decadiene, and mixtures thereof.

18. The crosslinked power cable of claim 14, wherein the outer semiconductive layer is surrounded by one or more further layer(s) selected from the group consisting of: screen(s), jacketing layer(s), and other protective layer(s).

* * * * *